United States Patent [19]

Weinert

[11] Patent Number: 4,462,954

[45] Date of Patent: Jul. 31, 1984

[54] ENERGY CELL

[76] Inventor: Friedrich Weinert, 219-19-131st Ave., Jamaica, N.Y. 11413

[21] Appl. No.: 338,276

[22] Filed: Jan. 11, 1982

[51] Int. Cl.³ .............................................. G21C 7/00
[52] U.S. Cl. .................................. 376/208; 376/318; 376/320
[58] Field of Search ........................ 376/208, 318, 320

[56] References Cited

U.S. PATENT DOCUMENTS

| | | | |
|---|---|---|---|
| 2,875,143 | 2/1959 | Froman | 376/208 |
| 3,108,054 | 10/1963 | Blackman, Jr. | 376/208 |
| 3,140,411 | 7/1964 | Oikle, Jr. et al. | 376/208 |
| 3,288,682 | 7/1966 | Pollak | 376/208 |
| 3,309,622 | 3/1967 | Weiner et al. | 376/208 |
| 3,549,490 | 12/1970 | Moore | 376/208 |
| 4,340,970 | 7/1982 | Weinert | 376/208 |

Primary Examiner—Sal Cangialosi

[57] ABSTRACT

A self pulsating nuclear reactor plant comprising of a reactor cylinder concealing a pair of mobile nuclear mass blocks chosen for pendent radially motion inside a radial cylinder, whereby the arch of mobile mass blocks is limited by stationary mass blocks in such a fashion that when mobile mass blocks making contact in center of reactor they become super critical and repulsing each other from vertical position toward horizontal position vice versa. The mobile mass blocks are able to pump a working fluid throughout the entire system which includes fluid channels and one way valves directing the pressurized fluid into a liquid motor which activates an alternator as the exiting fluid from prime mover is directed into a storage container with increased volume to relax working fluid which then is extracted out of the storage container by the movement of mobile mass blocks to be directed through a circulation tank inside an energy cell consisting of a cooling system which includes a primary and a secondary cooling coil whereby primary cooling coil conceals the active part of the reactor to collect high energy charged particles which are transmitted and kept in orbit inside secondary coil which winds around moderator circulation tank inside an active substance to create induction currency which can be tapped by contact penetrating the energy cell.

5 Claims, 3 Drawing Figures

ENERGY CELL

TECHNICAL FIELD

This invention introduces a self oscillating nuclear power plant able to circulate a liquid medium by radial movements of a pair of nuclear mass blocks which becomes super critical when in contact with each other thereby emanating an energy burst in form of high energy charged particles which are collected and organized inside an energy cell to produce electric induction current.

BACKGROUND OF THE INVENTION

According to the present invention there is provided a self oscullating nuclear reactor power plant to improve the efficiency, safety and the endurance of a nuclear reactor plant. In todays standard a fission reactor had become too expensive, mainly because of their short life span limited by nuclear decay as introduced by a fission reaction whereby high energy charged particles are emanating from the nuclear fuel core and thereby penetrate throughout the nuclear structure introducing radiation, corrosion and nuclear decay. The present invention collects and organize those high energy charged particles which can be converted into induction current for consumer purpose and thereby improve the efficiency and reduce nuclear decay. There is a similar approach as indicated in references R. L. Moore, U.S. Pat. No. 3,549,490 Dec. 22, 1970 shows a reciprocation type of nuclear motor whereby the working fluid itself becomes super critical to introduce an energy impulse by nuclear oscillation whereby high energy charged particles are emitted by each nuclear thermo expansion but otherwise completely wasted and therefore introduces nuclear decay of the nuclear reactor involved. Reference R. I. Weiner et al U.S. Pat. No. 3,309,622 Mar. 14, 1967 introduces a self oscullating nuclear device to create high energy charged particles for the sole purpose of emitting powerful signal beacon or radiation beams into space. R. I. Weiner uses a direct head on collision between two nuclear mass blocks whereby the mechanical device to control the nuclear excursion is centralized around the center of the nuclear mass blocks and therefore puts a maximum stress to the mechanism not able to introduce nuclear excursion in a high frequency. The present invention has overcome the impact stress by centralizing the mechanical device above the critical mass blocks in form of a center pin used as axis for the pendant motion of the nuclear mass block. This insures a smooth mechanical procedure and also makes it possible to introduce a very high frequency nuclear excursion.

SUMMARY OF THE INVENTION

In todays technology mass and matter is recognized as the ultimate in energy meaning matter can be converted into energy and energy can be concentrated into matter. In this understanding we introduced fission reaction whereby five percent of the nuclear fuel is converted into energy and ninety five percent of the involved mass in wasted without any beneficial use. Therefore, the inventor designed a pulsar reactor able to convert twenty five percent of the nuclear fuel into useful power. The biggest problem in todays fission reactors is the large amount of medium needed to introduce a nuclear reaction whereby the medium become highly radioactive which in time will decay the entire structure of a nuclear reactor, therefore, shorten the life span and increase danger factors, which makes standard projects of nuclear fission reactors impractical and two expensive.

Additionally, till now the main energy obtained in a nuclear reactor was used to activate a steam plant to drive turbo electric generator which is a heavy glumsey and expensive set up. By todays standard there is no question the oscillating nuclear reactor is far more compact circulates its own medium by each nuclear impulse to do physical work, at the same time it emits high energy charged particles which can be organized in a cooling coil and directed to a high tension coil inside an energy cell to supply induction current. The present invention entitled "Pulsar Reactor" emits those energy impulses in intervals, therefore, a condenser is needed able to collect and store high energy charged particles for a short time long enough to fill the gap in between the electro magnetic impulses. There is no such a conductor available, therefore, the inventor designed a super conductor in form of an energy cell.

The Energy Cell is similar to a condensor or liquid acid battery. Its functioning is: to collect high energy charged particles and keep them in orbit in a copper tubing which winds around a grounded cylinder through which the working fluid from the nuclear reactor circulates the space inbetween the energy cell is filled with a active solution able to absorb some of the energy emitted by nuclear reaction. This is achieved by installing heavy zinc blades against the moderator tank inside the energy cell. Each energy impulse introduced by each nuclear excursion will release a large amount of high energy charged particles which are attracted and collected by the cooling coil from the reactor housing into the energy cell orbiting a negative moderator tank which acts as a cathode, meaning the energy impulse inside the nuclear reactor creates immediately a high tension electro magnetic field around the moderator tank inside the energy cell which can be tapped from the outside by an electric contacts. In between the energy impulses the active solution inside the energy cell will absorb conductive energy exchanged between secondary coil and the cathode whereby atoms from the copper tubing are exchanged visa verse with atoms of the zinc plates fasten against moderator tanks, therefore a steady supply of electro magnetic energy is secured between the energy impulses of the reactor and galvanic activity inside the energy cell, meaning two energy sources are combined inside an energy cell to supply a steady flow of an electric current to the consumer line. Additionally, the impulses inside the reactor also produce hydraulic power to do physical work. This will not only improve the efficiency, but also reduce corrosion or decay inside the reactor structure which till now limits the life span of a nuclar reactor. Meaning the present invention makes an oscillating nuclear reactor more efficient lighter per horsepower and improves the life span and safey factor of a nuclear reactor. I like to mention that in general nuclear power is recognized as the ultimate energy supply for man. But I questioned that because matter is already the product of a secondary energy source created when nothing, meaning absolute space in a high degree of symmetry as existing between the stars decays into a lower form of energy, therefore, the ultimate of energy are universal forces in space in a stage of harmony. But when universal forces which one can describe as gods or goddesses come out of balance perhaps because of territorial disputes then infinity is converted into antimatter and space into matter, the ultimate in fuel, meaning if man ever can leave the solar system and travel in intersteller space there is no more need for fuel because one travels inside the ultimate of energy meaning being among gods or godesses. I hardly can believe that a specimen like the human can physically enter the terrain of gods or godesses, but I know, we can travel into any distance, any dimension, or any domain mentally, therefore it is most important to keep a precise trace on Pioneer 10, in my opinion the announcement of Pioneer 10 leaving the solar system on June 18, 1983 was a hoax in bad taste. If Pioneer 10 can travel in interstellar space than man can travel in between the stars far simpler, far more efficient than ever imagined before in a space without limitations of speed meaning it takes millions of light years for a space vehicle to reach the nearest star, but it would take only a fraction of a second to reach any start througout the universe by a single thought . . . a thought is energy superior to matter and without a nucleus structure, therefore not bounded to electro magnetism or gravitational forces which do not exist in interstellar space. Therefore, measurements conducted throughout the universe by light speed are false because the photon of light behaves quite different in interstellar space as in comparison to planetary space.

OBJECTIVES OF THE INVENTION

A principal object of the invention is to provide a new and better approach to obtain energy out of a nuclear fission reactor. This is achieved by using a working fluid to control the impulses of a oscillant nuclear reaction as the thermo expansion created by each nuclear reaction introduces a hydraulic working impulse whereby high energy charged particles emanating from the nuclear reaction are collected and organized inside an energy cell to supply induction current for consumer purposes. This makes the present inventions more efficient, lighter per horsepower, as demanded in the aerodynamic and hydro dynamic industry. Oceanic mining will be the industry of the future, because it is the only source left to obtain strategic metals and minerals never known to man. Those treasures have been untouched because of technical difficulties to operate at the bottom of the sea, but with todays technology there is no question in the inventors mind that electrolysis is the answer in oceanic mining. Electrolysis needs a powerful electro magnetic energy source. The pulsar reactor of this invention would indeed supply enough hydraulic power to propel a sizeable vessel and at the same time create enough electro maganetic energy needed for oceanic mining. Further objects of this invention will be pointed out in the following detailed description and claims as illustrate in the accompanying drawing which discloses by way of example the principal of this invention and the best mode which has been contemplated of applying the principal.

DETAILED DESCRIPTION OF A PREFERRED EMBODIMENT

Figure 1:
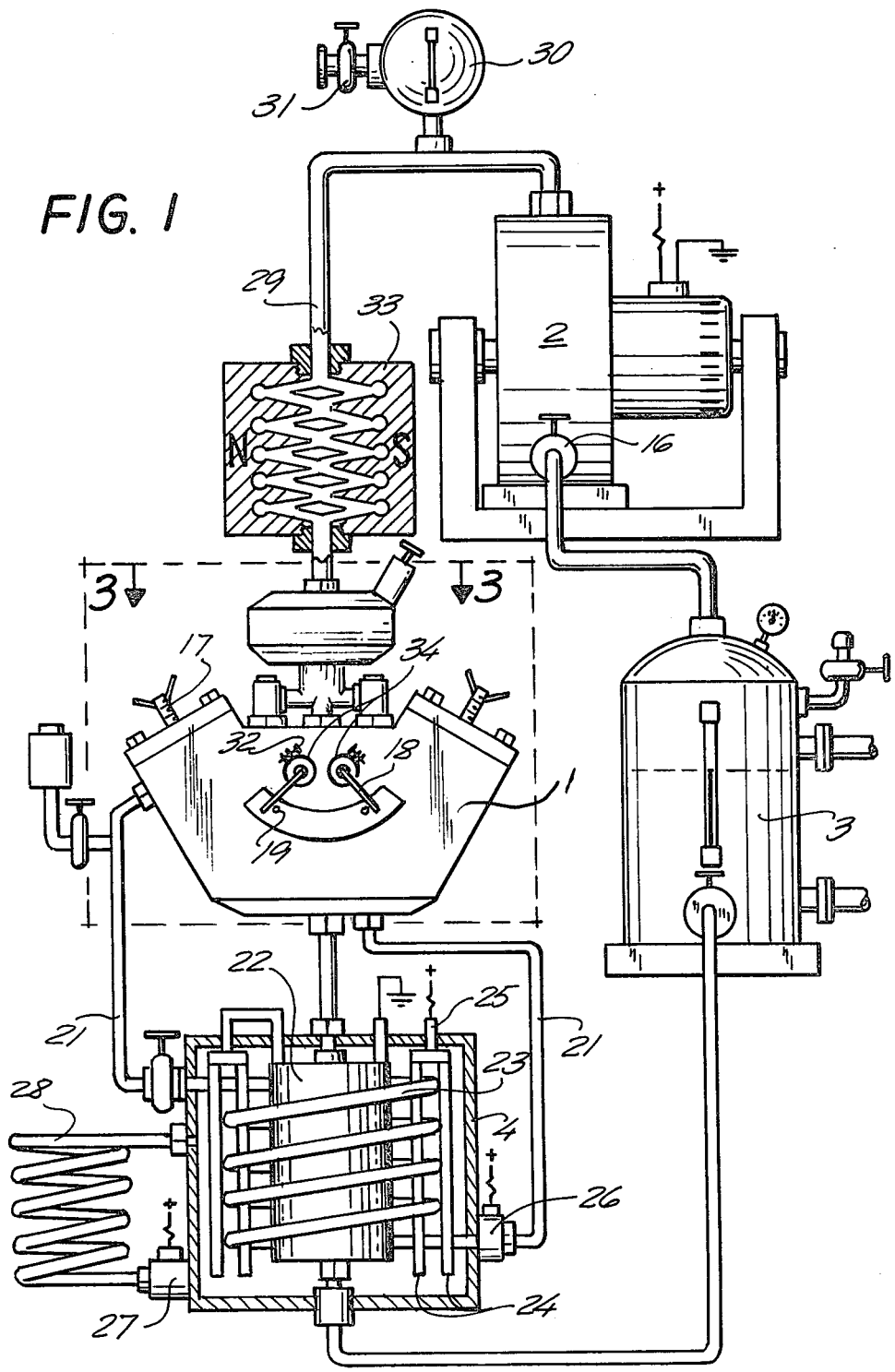
FIG. 1 is partly sectional explanatory view of a pulsar reactor plant on an off position.
Figure 2:
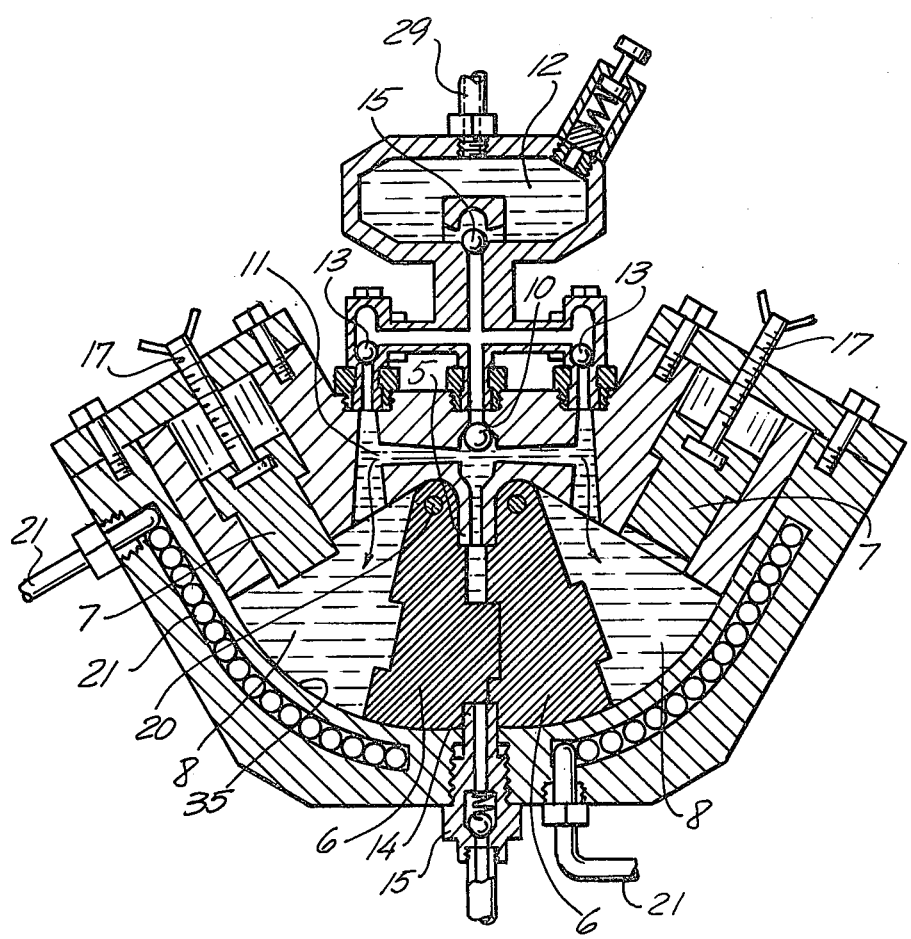
FIG. 2 is a cross section view of a pulsar reactor in active position whereby two mobile mass blocks make surface contact with each other to become super critical called position one.
Figure 3:
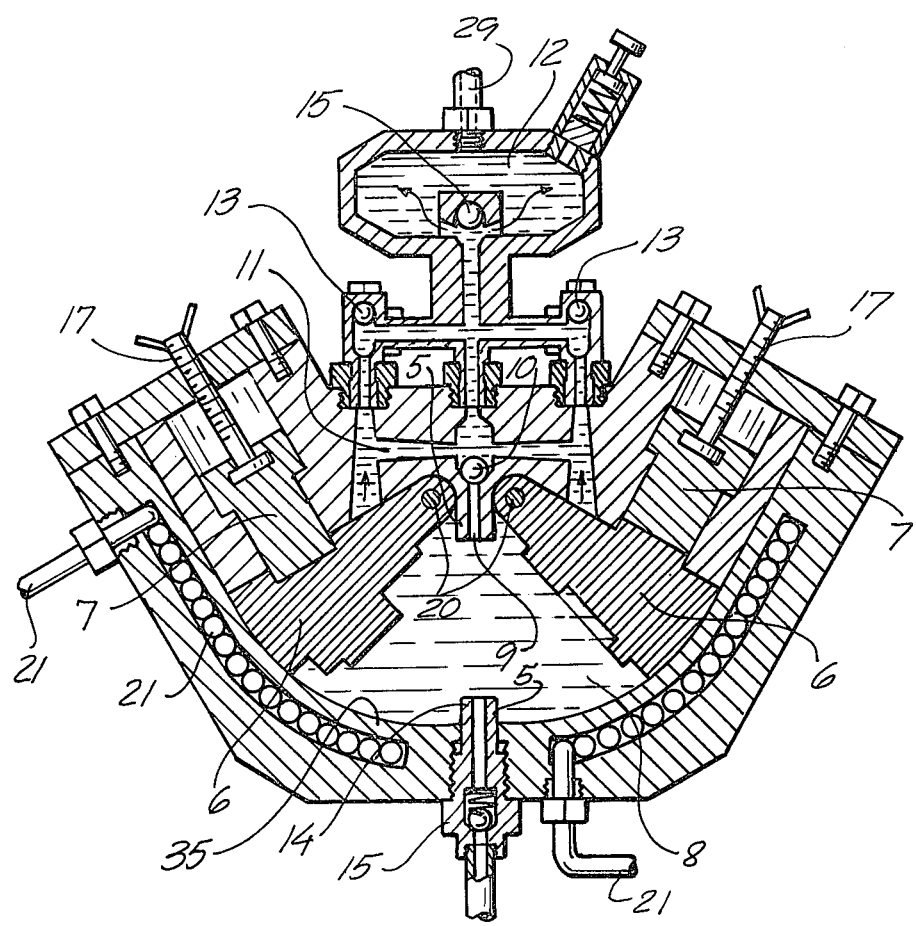
FIG. 3 is a cross section view of a pulsar reactor in an active position whereby two mobile mass blocks make contact with a pair of stationary nuclear mass blocks whereby all mass blocks become super critical called position two.

Referring to FIG. 1 there is shown a pulsar reactor with embodiment of the present invention. The system comprises of a reactor (1) and magnetic filter (33) a liquid motor or turbine (2) a moderator cooling tank (3) and an energy cell (4). Those units combined assemble a nuclear power plant. The reactor is shown in detailed drawings in FIGS. 2 and 3. Mobile nuclear mass blocks (6) hanging on an upper pin (20) which tends to move by gravitational force mobile mass blocks to the center of reactor or cylinder (35) limited by a suction stud (14) which is installed in center of reactor cylinder to limit the arch of mobile mass blocks in position 1. In this position both mobile nuclear mass blocks make surface contact and thereby become supercritical to introduce nuclear reaction which will repulse both nuclear mass blocks from each other into position 2 shown in FIG. 3. When the mobile mass blocks move away from each other they extract fluid through oneway valve (15) in this movement fluid trapped in between the mobile mass blocks and stationary mass blocks (7) become pressurized and therefore accelerated through channels (11) thereby open oneway valves (13 and 15) to clear the way into pressure cell (12) via pressure supply pipe (29). In order to activate prime mover FIG. 1(2) when mobile mass blocks make contact with stationary mass blocks they also become super critical by repulsing mobile mass blocks back to first position. When nuclear mass blocks move towards first position the fluid filling the space in between mobile mass blocks in forced through a bypass channel (9) by lifting the valve ball (10) to fill the space in between mobile nuclear mass blocks (6) and stationary mass blocks (7) as shown in FIG. 2(8). In this fashion pendant radially outward movement of mobile mass block is used to pump and extract fluid out of storage tank (3) through the fluid circulation tank (22) inside energy cell (4) into reactor (1) and pumped it back through the movement of mobile mass blocks throughout the entire reactor system.

To stop all nuclear reactions one has to turn spindle (17) which is connected with stationary nuclear mass blocks (7) outward as indicated in FIG. 1. At the same time two stopper pins FIG. 1(19) must be placed behind swing bars (18). This will keep the mobile mass blocks in a fixed position. The frequency of the movement of mobile mass blocks can be controlled by valve (16) or brake liners (34). The brake liners are installed around the pins of mobile nuclear mass blocks and can be adjusted by a screw or spindle as shown in FIG. 1(32) during operation the working fluid or moderator is used to activate a prime mover and at the same time to cool the interior of the nuclear reactor as an independent cooling system cools the housing of the nuclear reactor. This is accomplished through a copper tubing FIGS. 2–3(21) winding around the active part of nuclear reactor. This part is called primary coil. The secondary coil is installed inside the energy cell as shown in FIG. 1(23). High energy charged particles emanating during nuclear reaction are collected by the primary coil and transmitted to the secondary coild inside the energy cell. The copper coil is circulating by a conductive coolant.

ENERGY CELL

The energy cell is a hermetically sealed container FIG. 1(4) filled with an active solution. In center inside the energy cell is a tank installed (22). The tank acts as a cathode by having the working fluid or moderator circulating through it as the secondary coil of the coolant winds around it. This creates an electric inductive current between the secondary coil (23) and the circulation tank (22). The induction current can be tapped through contact bars (24) and contact (25). The active substance of the energy cell is pumped through a circulation pump (27) into an outside heat exchanger (28) for cooling purposes. The coolant of the reactor which circulates through a primary and secondary copper tubing is also kept in circulation through a circulation pump (26). The working fluid or moderator is circulated by the movement of mobile nuclear mass blocks. Energy charged particles emanating from the nuclear reaction are kept in orbit inside secondary cooling coil. The energy charged particles are emitted in intervals. This frequency is used to create galvanic energy made possible by applying heavy zinc plates against moderator circulation tank (22) or to coat the entire circulation tank (22) with zinc. The galvanic currency will exchange atoms from the copper tubing with atoms from the zinc plates on a vice versa base depending on the frequency of the nuclear impulses. The benefit obtained is to convert a uneven flow of current to an even flow of currency. I would like to state the introduction of the energy cell is not only an improvement of the present, but also an inspiration for future aspects. Throughout the electro magnetic net work system, condensers and transformers consuming a large amount of electro magnetic energy in form of resistance indicated by heat which radiates into space without useful purpose, but even worse during a nuclear burst electro magnetic pulses called EMP are emitted over a wide range in atmospheric space able to burn and explode condensers, transformers, computers, etc. The energy cell of the preent invention is immune against EMP. In fact, it would absorb additional energy and store it inside the active substance which will release the energy when needed. Therefore, the energy cell has a wide range of use. In another fact it should be made mandatory to deploy the energy cell in the utility net work systems to save energy and guarantee the consumer a steady energy supply even during a nuclear attack.

THE LIQUID CYCLE OF THE WORKING FLUID

It is to be recommended to use a very stable nuclear such as $_4H^2$ as moderator in order to limit radiation and make a one step nuclear heat conversion possible. The pressurized fluid exiting the nuclear reactor will pass through a magnetic filter FIG. 1(33) to enter into prime mover (2). At the highest point of the pressure pipe (29) is a gas pressure tank (30) installed. The pressure tank will secure a steady pressure stage made possible through a gas cushion which collects gases out of the working fluid. A surplus of gases can be released through pressure relief valve (31). The working fluid coming out of prime mover (2) is callected inside a storage tank (3). The storage tank reduces the pressure by its increased volume and cooling effect into relaxed stage. The suction of the pulsar reactor made possible by the volume exchange introduced by mobile nuclear mass blocks and valve functioning will extract the working fluid out of storage tank (3) into circulation tank (22) and back into reactor (1) to be pressurized into prime mover (2). It is understood that nuclear radiation penetrating the system has to be shielded by radioactive repellent minerals. The drawings of disclosure does not include those protection shields since they differentiate in designs.

I claim:

1. A self pulsating nuclear reactor plant comprising a pair of mobile nuclear mass blocks chosen for radially pendant motion in an arcuate cylinder filled with a liquid moderator, the arch of each mobile nuclear mass block being limited in a first position by direct surface contact between both mass blocks in vertical position where both mobile mass blocks become super critical, the resultant nuclear reaction moving both blocks apart to a second position, the arch of the mobile mass blocks limited by stationary nuclear mass blocks which again makes both sets of nuclear mass blocks super critical whereby the nuclear reaction repulses mobile mass blocks back towards the first position, this motion serving to pump a working fluid through the reactor to drive a liquid turbine or motor to do physical work, collecting high energy charged particles emanating from each nuclear excursion inside a copper primary coil filled with a coolant and directing said changed particles into a secondary coil inside an energy cell whereby secondary coil winds around a cathode through which the working fluid circulates, thus creating a induction current, the reactor comprising:
   (A) A pair of mobile nuclear mass blocks situated between a vertical and horizontal position inside an arcuate cylinder,
   (B) A pair of stationary nuclear mass blocks limiting the arch of mobile nuclear mass blocks,
   (C) A reactor housing in form of an arcuate cylinder with inlet and outlet valves to direct a working fluid through the reactor by the motion introduced by the nuclear reaction of the mobile nuclear mass blocks,
   (D) A cooling coil made from copper tubing circulating a coolant which carries radiated energy,
   (E) A magnetic filter to remove nuclear particles from the working fluid,
   (F) A liquid turbine motor driven by the working fluid accelerated inside the reactor, the motor being connected to a drive means,
   (H) A storage tank to store the working fluid,
   (I) An energy cell containing a circulation tank of the working fluid whereby the circulation tank acts as a cathode by a positive coil winding around cathode inside an active solution which is stimulated by impulses of electro magnetic forces and chemical interactions,
   (J) zinc plates installed around the cathode which interacts galvanically with the copper winding of the coil depending on the frequency of the nuclear impulses inside reactor housing.

2. A self pulsating nuclear reactor of claim 1 wherein the pair of mobile mass blocks are mounted on an upper pin whereby gravitical forces tends to introduce surface contact in center of the arcuate cylinder whereby both mobile nuclear mass blocks become super critical to repulse each other in a pendant radially motion from vertical position towards horizontal position whereby the arch of the mobile mass blocks is limited by a pair of stationary nuclear mass blocks which when in contact with mobile mass blocks will also become super critical and thereby repulsing mobile mass blocks to first position.

3. A self pulsating nuclear reactor of claim 1 wherein an energy cell contains a cathode in a form of a moderator circulation tank which is surrounded by a positive coil submerged in a solution which is able to absorb and emanate electro magnetic energy.

4. A self pulsating nuclear reactor of claim 3 wherein an independent valve body with several openings which can be mounted or dismounted on top of the reactor to regulate pump and suction action of the working fluid inside reactor into a steady pressure flow in one direction.

5. A self pulsating nuclear reactor of claim 4 wherein a pair of nuclear mass blocks acting as pistons to circulate a fluid by radial pendant motion whereby fluid is extracted from a storage tank into a pump cylinder so when nuclear mass blocks move away from each other meaning from vertical position towards horizontal position, said motion creates suction action, when the motion is reversed the fluid inbetween the mass blocks is then channeled through a series of one way valves and channels behind the mobile mass blocks, whereby when the nuclear mass blocks move outwards towards horizontal position the fluid trapped between the mass blocks and cylinder housing becomes pressurized and thereby accelerated through a series of one way valves and channels into a main pressure pipe to do physical work.

* * * * *